(12) United States Patent
Lee et al.

(10) Patent No.: US 7,548,699 B2
(45) Date of Patent: Jun. 16, 2009

(54) CHANNEL-LENGTH MODULATION (CLM) COMPENSATION METHOD AND APPARATUS

(75) Inventors: Kah Weng Lee, Singapore (SG); Bin Zhang, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 578 days.

(21) Appl. No.: 11/316,033

(22) Filed: Dec. 22, 2005

(65) Prior Publication Data

US 2007/0147849 A1 Jun. 28, 2007

(51) Int. Cl.
*H04B 10/04* (2006.01)
*H04B 10/00* (2006.01)

(52) U.S. Cl. .................. 398/192; 398/119; 398/136; 398/158; 250/551

(58) Field of Classification Search ................. 398/192, 398/158, 136, 119; 250/551
See application file for complete search history.

(56) References Cited

U.S. PATENT DOCUMENTS

| | | | | |
|---|---|---|---|---|
| 5,028,862 A * | 7/1991 | Roth | ................. | 323/273 |
| 7,123,075 B2 * | 10/2006 | Iorga | ................. | 327/530 |
| 2006/0044072 A1 * | 3/2006 | Kucharski | ................. | 332/149 |

* cited by examiner

*Primary Examiner*—Ken N Vanderpuye
*Assistant Examiner*—Daniel G Dobson

(57) ABSTRACT

A power supply generates a supply voltage that varies from a first voltage level to a second voltage level. A first current source is coupled to the power supply and generates a current that varies due to channel-length modulation. A channel-length modulation (CLM) compensation mechanism is provided to reduce the current variation of the first current source by compensating the channel-length modulation (CLM) of the first current source.

15 Claims, 4 Drawing Sheets

CHANNEL-LENGTH MODULATION (CLM) COMPENSATION METHOD AND APPARATUS

BACKGROUND OF THE INVENTION

Optocoupler systems are useful for many different applications wherein electrical isolation is needed between a first circuit and a second circuit. One exemplary application is to use an optocoupler to electrically isolate a user interface (e.g., a logic interface) from a high voltage signal.

Optocoupler systems include a first circuit and a second circuit that are electrically isolated from each other. The first circuit includes a light emitting diode (LED) that is coupled to a LED current source. The first circuit is optically coupled to a second circuit. The second circuit includes a photodiode (PD). For example, the LED emits light, which impinges on the photodiode, causing a current through the photodiode (e.g., a photodiode current). The second circuit also includes a transimpedance amplifier circuit that is coupled to the photodiode to generate an output voltage signal that is based on the photodiode current. The second circuit also includes a current source that generates a reference current. Typically, the photodiode current is compared with the reference signal, and this comparison is utilized to generate the output voltage signal.

An optocoupler system includes three primary components: 1) buffer, 2) isolation, and 3) detector. The buffer provides a constant current to drive a light source (e.g., a light emitting diode (LED)). This current is referred to as the LED current and caused the LED to light up. The light passes through the isolation that can be for example a transparent substance. It is noted that the light undergoes a certain amount of attenuation before receiving the detector. The detector converts the received light into corresponding electrical signals (e.g., a current signal and a voltage signal). The detector compares the voltage signal corresponding to the received light to a reference signal and generates an output signal (e.g., a "1" or "0") that is based on the comparison.

An important component in optocoupler systems is the current source used to drive the light emitting diode. One desired operation characteristic of a current source is the provision of a constant current signal. Unfortunately, the power supply may not be constant. For example, in a system with a 5V power supply, the actual supply voltage may be 10% above or below the 5V at any time. In other words, the power supply voltage can vary from about 4.5V to 5.5V. This variation in power supply voltage is also referred to as "power supply swing." Power supply swing introduces issues and design concerns in designing the current source.

One such design concern is that when the power supply swings, the current generated by a current source that is coupled to the power supply can vary widely due to channel length modulation (CLM). For-example, in the above example, the variation of the current provided by the current source can vary by more than ten percentage points and in some cases can vary by a few tens of percentage points. As can be appreciated, a current source with wide variation in output current is not desired in any application, especially the optocoupler.

Consequently, current variation due to channel length modulation (CLM) and power supply swing poses significant challenges for the design and construction of the current source. One prior art approach is to use a cascode current source. Unfortunately, a cascode current source has a large threshold voltage, which in addition to low power supply voltages, can cause the current source to fail under certain conditions. Others have proposed increasing the channel length of the current source. However, this attempt to address the channel length modulation problem also encounters headroom issues or requires the increase of the overall size of the transistor (e.g., the width of the device) used to implement the current source.

Based on the foregoing, there remains a need for a channel-length modulation (CLM) compensation method and apparatus that overcomes the disadvantages set forth previously.

SUMMARY OF THE INVENTION

According to one embodiment of the present invention, a channel length modulation compensation mechanism method and apparatus are described. A power supply generates a supply voltage that varies from a first voltage level to a second voltage level. A first current source is coupled to the power supply and generates a current that varies due to channel-length modulation. A channel-length modulation (CLM) compensation mechanism is provided to reduce the current variation of the first current source by compensating the channel-length modulation (CLM) of the first current source.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A channel-length modulation (CLM) compensation method and apparatus that reduce the current variation of a first current source by compensating the channel-length modulation (CLM) of the first current source are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Optocoupler System 100

Figure 1:
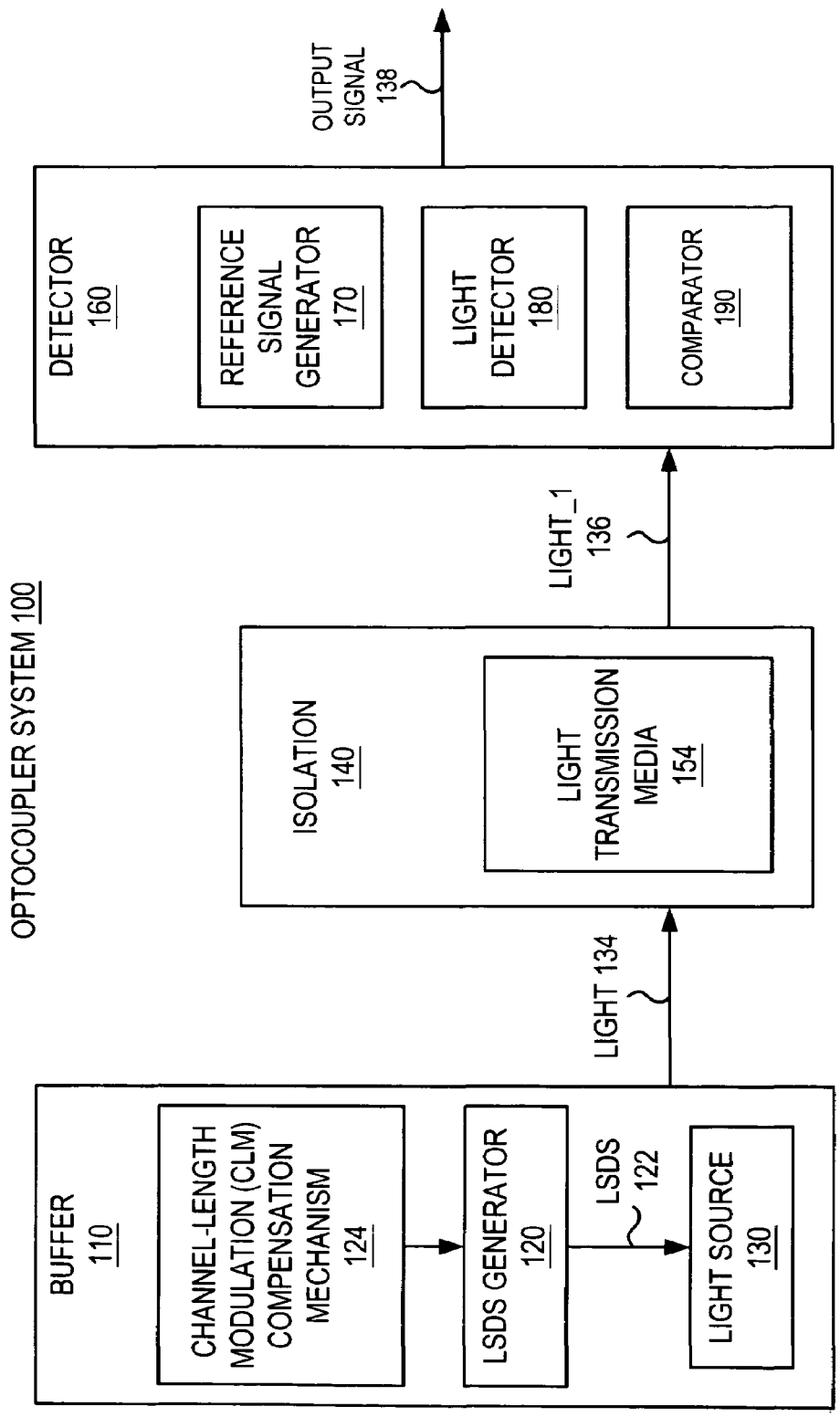
FIG. 1 illustrates a block diagram of an optocoupler system that includes a channel length modulation compensation mechanism according to one embodiment of the invention.

FIG. 1 illustrates a block diagram of an optocoupler system 100 that includes a channel-length modulation (CLM) compensation mechanism 124 according to one embodiment of the invention. The optocoupler system 100 includes three main components or sections: a buffer 110, isolation 140 and a detector 160. The buffer 110 generates a light 134 that passes through the isolation 140, which attenuates the light 134 to generate an attenuated light 136 that is denoted light_1. The isolation 140 can include a light transmission media 154. The detector 160 receives the attenuated lights_1 136 and responsive thereto generates an output signal 138 (e.g., a current signal or voltage signal that represents the light detected by detector 160) that is based on the attenuated light_1 136.

The buffer 110 includes a light source 130 (e.g., a light emitting diode (LED)) that generates light 134. The buffer 110 also includes a light source drive signal (LSDS) generator 120 that generates a light source drive signal (LSDS) 122. In one embodiment, the light source drive signal (LSDS) generator 120 is implemented with a first current source. The LSDS generator 120 is coupled to a power supply to receive a power supply signal (e.g., a power supply voltage signal). The power supply voltage signal can vary from a first power supply voltage level to a second power supply voltage level, which is referred to as power supply swing. In one embodiment, the power supply generates a power supply voltage signal that varies from a first voltage level to a second voltage level. In one example, the power supply voltage can vary from about 3V to about 5.5V. This voltage supply swing causes the LSDS generator 120 to generate a drive signal that varies with respect to the power supply voltage signal provided to the LSDS generator 120. The variation in the drive signal (e.g., current signal) is generally attributed to channel-length modulation of the LSDS generator (e.g., first current source 120).

The buffer 110 also includes a channel-length modulation (CLM) compensation mechanism 124 that is coupled to the LSDS generator 120. As described previously, the LSDS generator 120 is coupled to the power supply and generates a drive current (LSDS 122) for the light source that varies due to channel-length modulation. A channel-length modulation (CLM) compensation mechanism 124 is provided to reduce the current variation of the LSDS generator 120 by compensating the channel-length modulation (CLM) of the first current source. In one embodiment, the channel-length modulation (CLM) compensation mechanism is integrated with the LSDS generator 120. In an alternative embodiment, the channel-length modulation (CLM) compensation mechanism is separate from the LSDS generator 120.

The light 134 generated by the light source 130 then passes through the isolation 140, which in one example, is a transparent substance. As described previously, the light 134 undergoes a certain amount of attenuation before reaching the detector 160.

Figure 2:
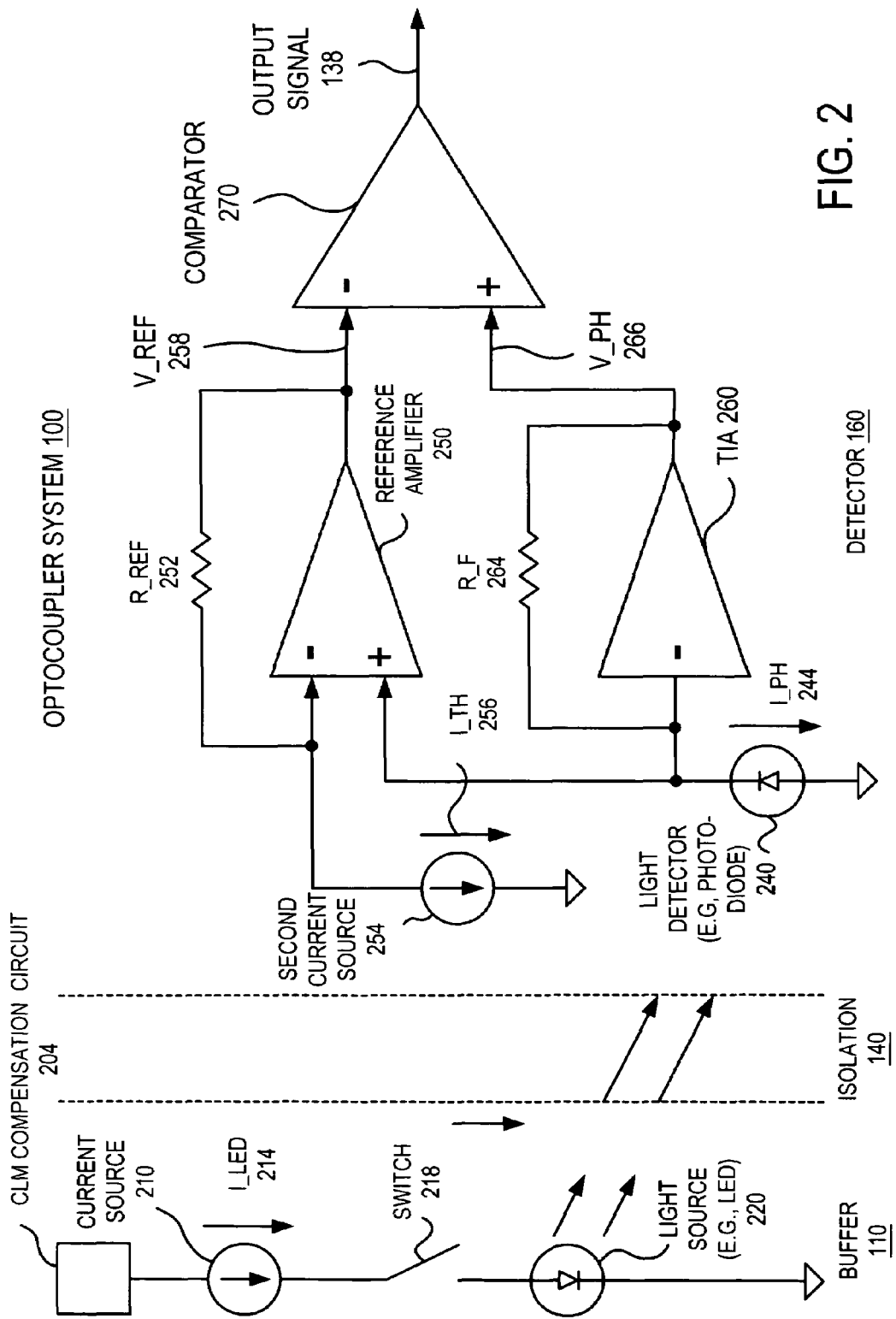
FIG. 2 illustrates in greater detail the optocoupler system of FIG. 1 according to one embodiment of the invention.

FIG. 2 illustrates in greater detail the optocoupler system of FIG. 1 according to one embodiment of the invention. In this embodiment, the light source drive signal (LSDS 122) is a current signal 214 that is denoted I_LED. Specifically, the light source drive signal generator 120 is implemented with a first current source 210 that provides a current (I_LED) to the light source 130 to light up the light source 130.

The CLM compensation mechanism 124 is implemented in this embodiment with a CLM compensation circuit 204 that reduces the variation in I_LED due to channel length modulation of the first current source 210. A power supply signal that varies from a first voltage level to a second voltage level is provided to the first current source 210. The first current source 210, which is coupled to the power supply, generates a current with a large current variation due to channel-length modulation when the power supply varies from a first voltage level to a second voltage level. The channel-length modulation (CLM) compensation mechanism 204 is provided to compensate the channel-length modulation (CLM) of the first current source and to reduce the current variation of the first current source 210. In one embodiment, channel-length modulation (CLM) compensation mechanism is implemented with a second current source that compensates the channel-length modulation (CLM) of the first current source. The second current source has resistive characteristics and models the CLM due to supply swing.

One circuit implementation of the channel length modulation compensation mechanism is described in greater detail hereinafter with reference to FIG. 3.

In this embodiment, the detector 160 includes a light detector 240, a reference amplifier 250, a second current source 254, a transimpedance amplifier (TIA) 260 and a comparator 270. The light detector 240 can be implemented with a photodiode. The photodiode 240 includes a first electrode that is coupled to a predetermined power signal (e.g., a ground signal) and a second electrode. The photodiode 240 receives the light from the isolation 140 and converts the light into a corresponding electrical signal For example, the detector 160 converts received light into a current (I_PD) 244 and a voltage V_ph 266, where V_ph is equal to IPD*R_f.

The reference amplifier 250 includes an inverting input, a non-inverting input, and an output. The inverting input is coupled to the second current source 254, which can be implemented with a battery and resistor connected in series, and the non-inverting input is coupled to the second electrode of the photodiode 240. The second current source 254 generates a current denoted I_TH that can be based on a resistor. A reference resistor 252 (R_REF) is coupled across the inverting input and an output of the reference amplifier 250. The reference amplifier 250 generates a reference signal 258 (e.g., a reference voltage signal, V_REF 258) at the output. The reference voltage (V_REF) 258 may be determined by the following expression: V_REF=ITH*R_REF.

The transimpedance amplifier (TIA) 260 includes an inverting input and an output. The inverting input is coupled to the second electrode of the photodiode 240. A resistor 264 (R_F) is coupled across the inverting input and an output of the TIA 260. The TIA 260 detects the photo diode current, I_PH, and based thereon generates a photodiode signal 266 (e.g., a photodiode voltage signal, V_PH) at the output. The photodiode voltage (V_PH) may be determined by the following expression: V_PH=IPH*R_F.

The comparator 270 includes an inverting input that is coupled to the output of the reference amplifier 250 and a non-inverting input that is coupled to the output of the transimpedance amplifier 260. The comparator 270 includes an output for generating an output signal 136. The comparator 270 compares the V_REF with V_PH to generate either a logic high signal (e.g., a logic "1" signal) or a logic low signal (e.g., a logic "0" signal).

It is noted that the I_LED signal 214 may be a function of a first resistor (R1). Also, the I_TH signal 256 may be a function of a second resistor (R2). In one embodiment, the first resistor and second resistor are matched. Since both resistor R1 and resistor R2 are matched, both the I_LED signal and the I_TH signal are matched and will generally vary in a similar fashion across different process variations and temperature variations.

Channel-Length Modulation Compensation Circuitry

According to one embodiment, an additional current source is provided that compensates the CLM of the main current source. The new current source has a resistive characteristic and models "the channel-length modulation" due to the supply swing. It is noted that unlike the prior art proposed solutions, the apparatus and method according to the invention does not encounter the headroom problem.

Figure 3:
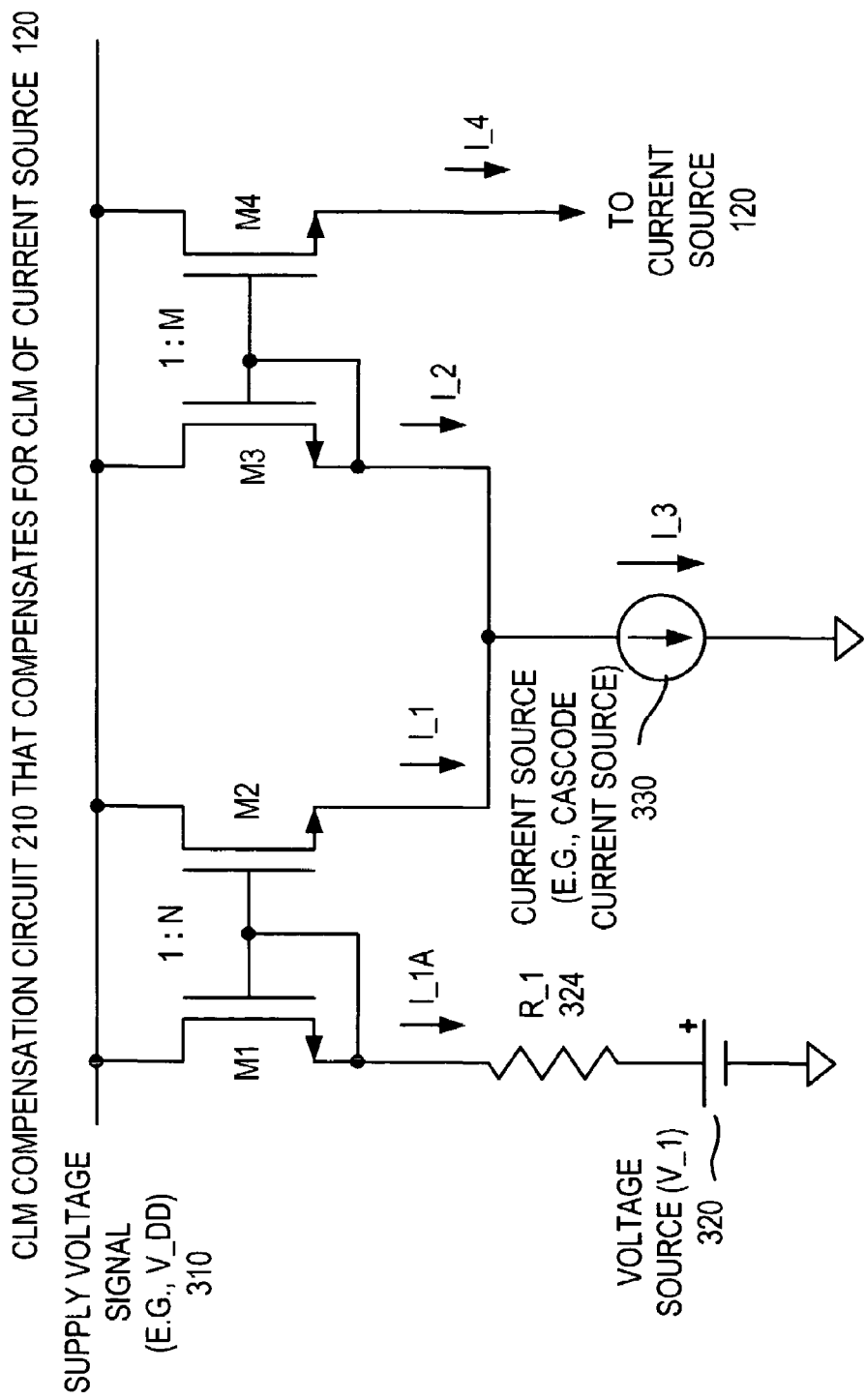
FIG. 3 illustrates an exemplary circuit diagram the channel length modulation compensation mechanism according to one embodiment of the invention.

FIG. 3 illustrates a circuit diagram or schematic for the channel-length modulation compensation circuitry for the current source. In one embodiment, the channel-length modulation compensation mechanism is implemented with a second current source.

The channel-length modulation compensation circuitry includes a voltage source 320 that is denoted V_1. The voltage source 320 is used to control the turn on of the current I_1A. Current I_1A is on when the supply voltage signal (V_DD) 310 is more than V_1 and the gate to source voltage ($V_{GS}$) of transistor M1. In other words, when V_DD is greater the sum of V_1 and $V_{GS}$ of transistor M1, current I_1A turns on. Voltage source 320 (V_1) can be implemented with diodes. The voltage source 320 (V_1) can be adjusted to switch on current I_1A when the channel-length modulation begins. In one example, channel-length modulation begins when the supply voltage is equal to about 3V.

Resistor 324 (R_1) has a resistance that models the channel-length modulation (CLM). The value of resistor 324 may be calculated from simulation as described in greater detail hereinafter with reference to FIG. 4.

Transistor M1 and transistor M2 are sized in a manner that conforms to a 1:N ratio. Consequently, the current I_1 is equal to N times the current I_1A. Current I_3 is a fixed current and can be generated by a cascode current source 330. Current I_2 is the current that is to be compensated for CLM. It is noted that current I_2 may be determined by the following expression: $I_2=I_3-I_1$. Since current I_1 is only turned on at a specific supply voltage, current I_1 has a resistive characteristic, which models CLM due to variation of the supply voltage, and current I_3 is a fixed current source, the current due to the CLM is subtracted from current I_2 by current I_1. In this manner, the excess current due to CLM of current I_2 is compensated. In one embodiment, the channel-length modulation compensation circuitry reduces the variation of the current due to CLM by more than about 10 percent (10%). In one embodiment, transistor M3 and transistor M4 are sized in a manner to conform to a 1:M ratio. The ratio 1:M can be selected to so that current I_4 and current I_2 are related to each other in a predetermined manner. It is noted that the values of N and M can be adjusted to any real value.

Figure 4:
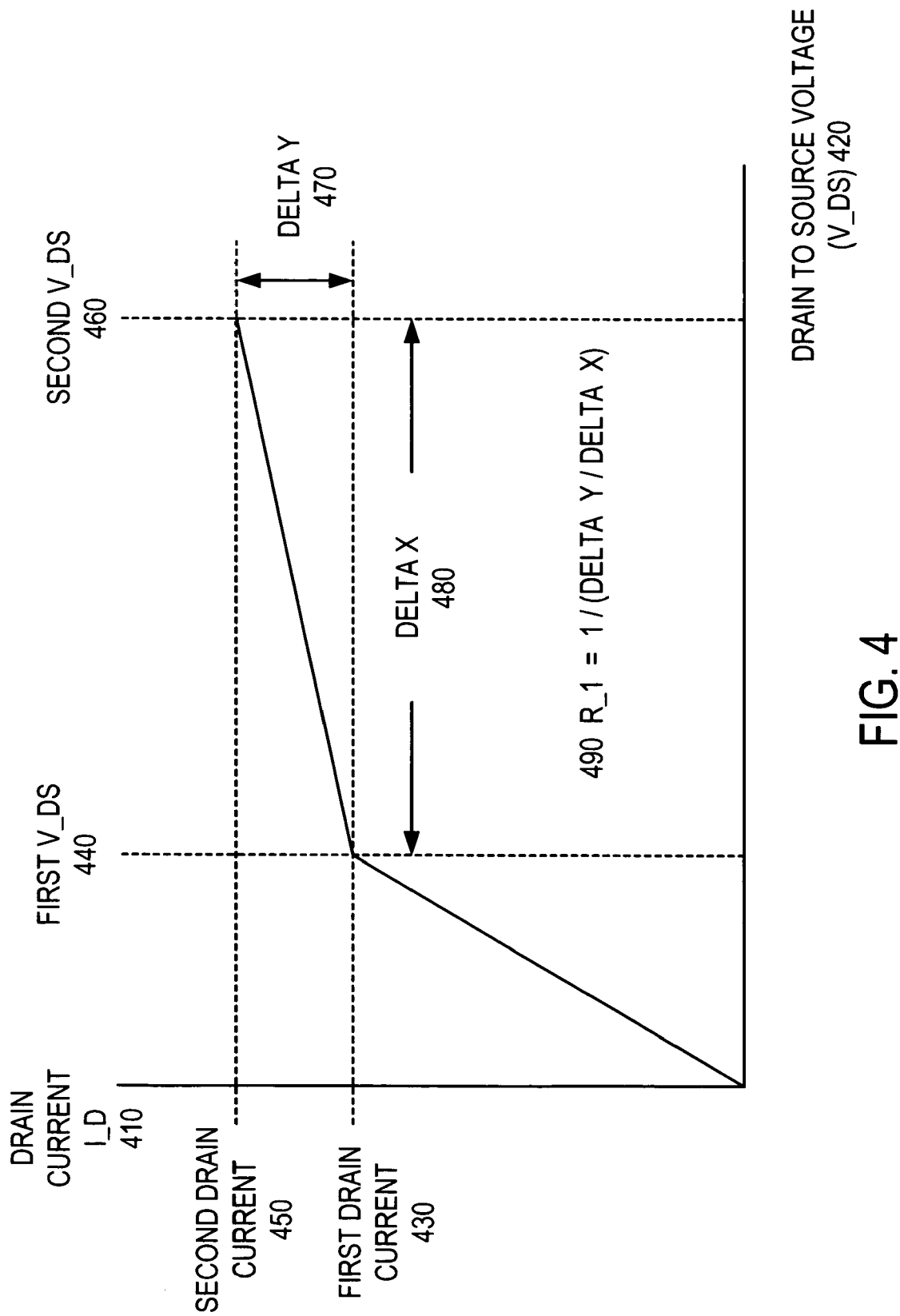
FIG. 4 is a drain current (I_D) versus drain to source voltage (V_DS) graph that illustrates the effect of channel length modulation on the drain current of a current source.

FIG. 4 is a drain current (I_D) versus drain to source voltage (V_DS) graph that illustrates the effect of channel length modulation on the drain current of a current source. It is noted that at a first drain to source voltage (V_DS_1) the drain current has a first value (I_DS_1). Similarly, it is noted that at a second drain to source voltage (V_DS_2) the drain current has a second value (I_DS_2). The difference between the second drain current (I_DS_2) and the first drain current (I_DS_1) is denoted as delta Y. The difference between the second drain source voltage (V_DS_2) and the first drain source voltage (V_DS_1) is denoted as delta X. In one example, the first drain to source voltage (V_DS_1) is about 3V, the second drain to source voltage (V_DS_2) is about 5.5V, and the variation in drain current between the first drain to source voltage (V_DS_1) and the second drain to source voltage (V_DS_2) is more than about 10 percent (10%).

With reference to FIG. 4, a resistance (R_1) can be utilized to model the channel-length modulation (CLM). In one embodiment, the resistance (R_1) may be expressed as the inverse of the slope of the portion of the graph of I_D versus V_DS between the first drain source voltage (V_DS_1) and the second drain source voltage (V_DS_2). The slope may be expressed as delta Y divided by delta X (i.e., delta Y/delta X). The value (R_1) can be calculated or determined from simulation by using one or more circuit simulation programs, such as Simulation Program, Integrated Circuit Emphasis (SPICE).

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An optocoupler system, comprising:
   a light source that when driven by a drive signal is configured to generate light;
   a first current source coupled to the light source and coupled to a voltage that varies, the drive signal varying in response to the changing voltage due to channel length modulation;
   a channel length modulation compensation mechanism coupled to the first current source and configured to reduce the variation in the drive signal of the first current source caused by the channel length modulation of the current source, the channel length modulation mechanism comprising first and second current mirrors, a voltage source, and a resistor, the resistor having a value based on the expression: 1/(delta Y/delta X), wherein delta Y is the difference between a second drain current of the second current mirror and a first drain current of the first current mirror, and delta X is the difference between a second drain to source voltage of the second current mirror and a first drain to source voltage of the first current mirror.

2. The system of claim 1, wherein the variation between the first drain to source voltage and the second drain to source voltage is more than about 10 percent (10%).

3. The system of claim 1, wherein the voltage source comprises diodes.

4. The system of claim 1, wherein:
   the first current mirror has a 1:N ratio;
   the second current mirror has a 1:M ratio;
   and N and M can be adjusted to any real value.

5. The system of claim 1, wherein the channel length modulation compensation mechanism further comprises:
   a second fixed current source operably coupled to the first current mirror and the second current mirror.

6. The system of claim 5, wherein the second fixed current source is a cascade current source.

7. The system of claim 1, wherein the channel length modulation begins when the voltage is equal to about 3 volts.

8. The system of claim 1, wherein the channel length modulation compensation mechanism is configured to reduce the variation of the drive signal due to channel length modulation by more than about 10 percent (10%).

9. A system, comprising:
   a power supply configured to generate a supply voltage that varies from a first voltage level to a second voltage level;
   a first current source operably coupled to the power supply and configured to generate a current that varies due to channel-length modulation; and
   a channel-length modulation (CLM) compensation mechanism, operably coupled to the first current source, and configured to reduce the current variation of the first current source by compensating the channel-length modulation (CLM) of the first current source, the channel length modulation mechanism comprising first and second current mirrors, a voltage source, and a resistor, the resistor having a value based on the expression: 1/(delta Y/delta X), wherein delta Y is the difference between a second drain current of the second current mirror and a first drain current of the first current mirror, and delta X is the difference between a second drain to source voltage of the second current mirror and a first drain to source voltage to the first current mirror.

10. The system of claim 9, wherein the channel length modulation compensation mechanism further comprises a second fixed current source operably coupled to the first current mirror and the second current mirror.

11. The system of claim 10, wherein the second fixed current source is a cascode current source.

12. The system of claim 9, wherein:
the first current mirror has a 1:N ratio;
the second current mirror has a 1:M ratio;
and N and M can be adjusted to any real value.

13. The system of claim 9, wherein
the voltage source is operably coupled to the second current mirror.

14. The system of claim 9, wherein the variation between the first drain to source voltage and the second drain to source voltage is more than about 10 percent (10%).

15. The system of claim 9, wherein the voltage source comprises diodes.

* * * * *

UNITED STATES PATENT AND TRADEMARK OFFICE
CERTIFICATE OF CORRECTION

| | |
|---|---|
| PATENT NO. | : 7,548,699 B2 |
| APPLICATION NO. | : 11/316033 |
| DATED | : June 16, 2009 |
| INVENTOR(S) | : Kah Weng Lee et al. |

It is certified that error appears in the above-identified patent and that said Letters Patent is hereby corrected as shown below:

Column 6, Line 41 (Approx.), Claim 6, delete "cascade" and insert --cascode--.

Column 6, Line 67, Claim 9, after "voltage" delete "to" and insert --of--.

Signed and Sealed this
Twenty-fifth Day of September, 2012

David J. Kappos
*Director of the United States Patent and Trademark Office*